Nov. 23, 1954 S. HANSEN 2,695,165
ELECTROMAGNETIC ACCELEROMETER
Filed July 14, 1950 3 Sheets-Sheet 1

INVENTOR.
SIEGFRIED HANSEN.
BY Nicholas T Volex
ATTORNEY

Nov. 23, 1954         S. HANSEN         2,695,165
ELECTROMAGNETIC ACCELEROMETER
Filed July 14, 1950         3 Sheets-Sheet 2

INVENTOR.
SIEGFRIED HANSEN
BY Nicholas T. Vitro
ATTORNEY

INVENTOR.
SIEGFRIED HANSEN
BY Nicholas T. Vohr
ATTORNEY

2,695,165

ELECTROMAGNETIC ACCELEROMETER

Siegfried Hansen, Los Angeles, Calif., assignor, by mesne assignments, to Hughes Aircraft Company, a corporation of Delaware Application July 14, 1950, Serial No. 173,761

8 Claims. (Cl. 264—1)

This invention relates to a precision accelerometer for obtaining acceleration measurements of moving objects.

Recent advance in navigational systems have imposed exceptionally rigid performance requirements on accelerometers used with the systems of this type.

In all the known forms of inertial or celestial long-range guidance systems, some type of sensitive precision accelerometer is employed as a sensing device to detect accelerations of the vehicle in the horizontal plane. In general, two independent accelerometers are placed so as to measure accelerations along two perpendicular directions lying in the horizontal plane. The output of each accelerometer is integrated once to give velocity and integrated a second time to give displacement along the two horizontal directions. Assuming that the accelerometer platform is maintained accurately horizontal by some stabilizing means, it is very important that the accelerometers themselves have good zero stability, that is, they must have zero output when not subjected to acceleration. For example, if the accelerometer has a false output of only 0.001 g, it will result in a position error of 0.001 radian which when multiplied by the 4000 mile radius of the earth results in a 4 mile error in position. It is desired to measure position to about 0.1 mile, which means that the accelerometer zero error must be held to about 0.000025 g. During steady flight, good zero stability is the most important requirement placed on the accelerometer.

During the takeoff, however, the vehicle is subjected to large accelerations and, at this time, it is necessary that a high degree of linearity be maintained in the relation between acceleration and accelerometer output. The linearity required can only be derived by a detailed analysis of the navigation system; suffice it to say that in a typical system a linearity of 0.1% is required. This invention discloses a precision accelerometer of the force balance type for use in such navigation systems. A force balance accelerometer comprises a test mass which is suspended in such a manner that unmeasured forces acting on the mass are reduced to a minimum, together with a device, usually electromagnetic, for generating an accurately measured force which accelerates the test mass by exactly the amount required to maintain it fixed with respect to the vehicle whose acceleration is being measured.

In previous accelerometers known to the art, the test mass is usually constrained to move along a single direction by some form of low friction bearing such as jewel pivots, air bearings, or jewel pivots combined with oil flotation. While such bearings can be made to have a very low residual force, this force is not zero, and since it is added to the true force due to acceleration, it introduces an error in the force developed by the electromagnetic thrust device. Accelerometers have been built which approach closely to the stability and linearity requirements given above, but this is possible only with extreme precision of construction and very exacting attention. Prior art also includes accelerometers in which the test mass includes field coils and the permanent magnets are mounted on the main frame. In the accelerometers of this type, it becomes necessary to connect the coils through flexible "pig-tails" or conductors with the sources of currents mounted on the main frame. These flexible conductors invariably contribute some indeterminate, variable error to the readings of the accelerometers of the above type. Although in the structure of the above type it is possible to obtain relatively light test mass, the error introduced by the large number of "pig tails" having finite flexibility lacks any degree of constancy to be compensated for in any manner by some corrective component of current. In the disclosed accelerometer, by placing the test mass in the center and making permanent magnets an integral part of this mass, it has become possible to eliminate all flexible conductors between the test mass and the frame of the accelerometer.

It is a feature of my invention that the function of supporting and constraining the test mass is not performed by a separate bearing, but instead the support and constraint results entirely from the forces produced by the electromagnetic thrust devices. Since these forces are being accurately measured, and are the only forces acting on the test mass, the error due to separate means of support is entirely eliminated and a more accurate measure of acceleration is made possible than with the accelerometers of the prior art.

In the disclosed accelerometer, the acceleration measurements are obtained by measuring currents flowing through stationary coils which are used for supporting a mechanical structure or the test mass by means of an interaction between the magnetic field produced by the coils and the flux produced by permanent magnets which constitute a part of the magnetically suspended test mass of the accelerometer. Minute displacements of this mass within the electromagnetic field are detected and magnified by means of an optical system provided with a source of light and a cylindrical reflecting mirror, the reflected light being used for altering the resistance of a light sensitive cell. Thus, the test mass is suspended in air and is completely devoid of any mechanical linkages, pivots, or supports which limit the sensitivity of all accelerometers known to the prior art.

It is therefore an object of this invention to provide an accelerometer of exceptionally high sensitivity and stability, the above performance characteristics being obtainable by suspending the acceleration sensitive element, or the test mass, of the accelerometer by means of a plurality of intracting magnetic fields and by using a source of light, a light beam produced by this light, and an optical system for detecting minute displacements of the test mass and converting the optically magnified displacement of the test mass into electric current changes, utilizing these current changes for resisting and restoring the test mass into its normal position by producing a force to oppose a force due to acceleration acting on said test mass, and indicating the magnitude of the acceleration on an electric meter.

It is an additional object of this invention to provide an accelerometer having a plurality of permanent magnets constituting a part of the test mass and a plurality of fixed current carrying coils positioned in operative relationship with respect to the permanent magnets with the result that the test mass is suspended in air because of the interaction between the magnetic fields produced by the coils and the permanent magnets.

It is also an object of this invention to provide an accelerometer having a test mass in the form of a triaxial cross with permanent magnets mounted at the outer ends of said cross, the north and south poles of each of said magnets being surrounded with north pole and south pole current carrying coils producing electromagnetic fields of such magnitude and direction as to support said triaxial cross in air, these coils being connected to an electro-optical system which is capable of altering the currents flowing through the coils so as to resist any displacement of the triaxial cross with respect to these coils, the changes in currents constituting measurable current changes used for indicating the aceleration imparted to the triaxial cross at any given time.

An additional object of this invention is to provide electronic circuits for measuring the above-mentioned current changes for indicating in faithful manner these changes.

The novel features which I believe to be characteristic of the invention, both as to its organization, method of operation, and method of manufacture, together with further objects and advantages thereof, may best be understood by reference to the following description taken in connection with the accompanying drawings in which:

Fig. 1 is a diagrammatic perspective view of the suspended structure of the accelerometer and of field coils;

Fig. 1-A is a schematic perspective view, partly in section, of a magnetic structure suitable for use on the ends of arms of a triaxial cross illustrated in Fig. 1;

Figure 1:
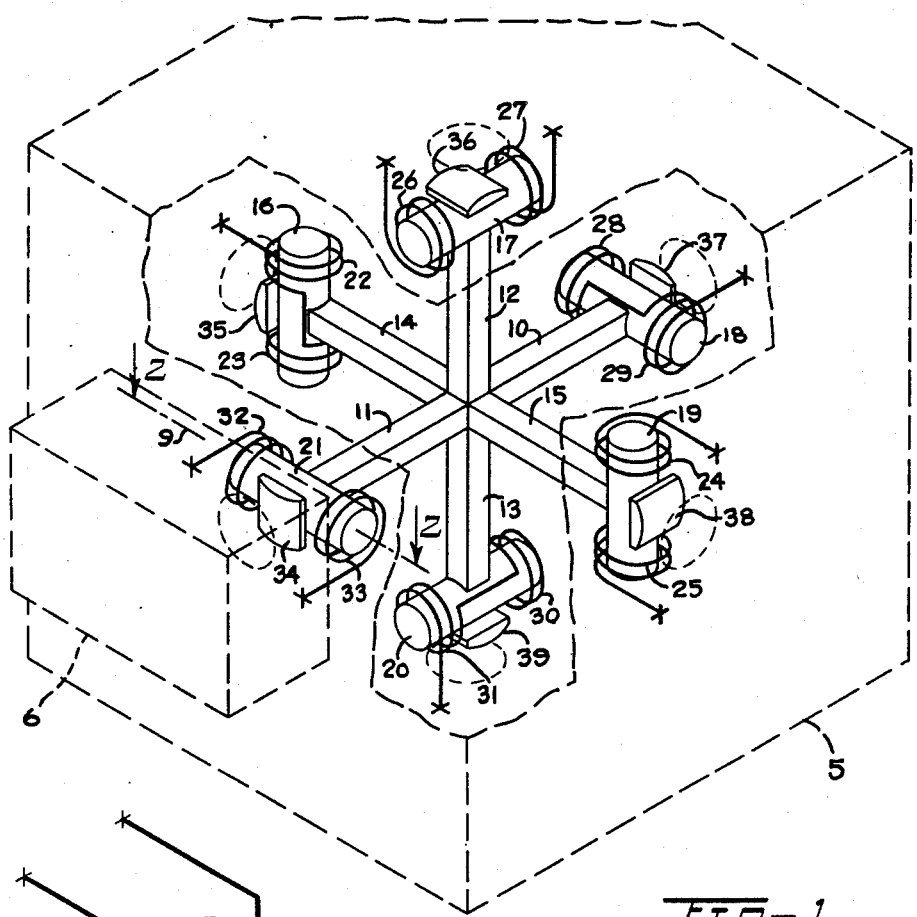
Figure 1A:
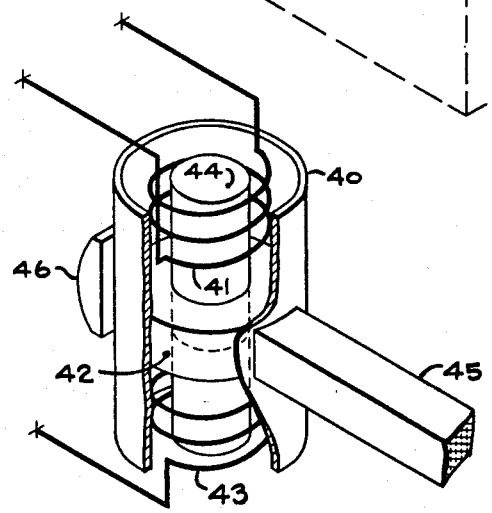

Referring to Fig. 1, it illustrates a perspective view of a box 5 housing the entire accelerometer. Box 5 is supported by any moving vehicle, such as an airplane, whose acceleration is to be measured. Box 5 has six additional boxes attached to it, only one box, box 6, being illustrated in the figure. Box 6 houses the optical system for the test mass, and shields it from the sources of light of all remaining optical systems. The same figure also illustrates the magnetically suspended acceleration-sensitive element of the accelerometer or the so-called test mass and field producing coils coupled in operative relationship with respect to this element. The test mass has six arms 10 through 15, all having identical dimensions and weight and forming a rigid mechanical joint at the point of intersection of all arms, which is the center point and the center of gravity of the element. The arms thus form a triaxial cross in which the axes of the cross form right angles with each other in the manner of X, Y, and Z axes in three-dimensional coordinates. For the sake of brevity, the configuration of this element will be called, in this specification and claims, the triaxial cross. The outer ends of the six arms are rigidly attached to their respective permanent magnets, 16 through 21, and the outer surface of the magnets are equipped with reflecting mirrors 34 through 39 which have the shape of a plano-convex cylindrical lens. Twelve current coils 22 through 33 surrounds the outer ends of the respective permanent magnets in a manner so that air gaps exist between the coils and the magnets. The six arms 10 through 15, the permanent magnets 16 through 21 and the mirrors 34 through 39 constitute the test mass of the accelerometer. In order to clearly illustrate the relationship between the triaxial cross and the magnetic systems which form a part of the test mass, certain components of the magnetic circuits have been omitted from Fig. 1; however, in Fig. 1–A, the sleeve 40 and the spacing ring 42 are representative of the components omitted from each of the magnetic circuits; while permanent magnet 44, coils 41 and 43, the mirror 46, and the arm 45 are also representative of corresponding elements forming the triaxial cross and the complete test mass.

Figures 2, 3:
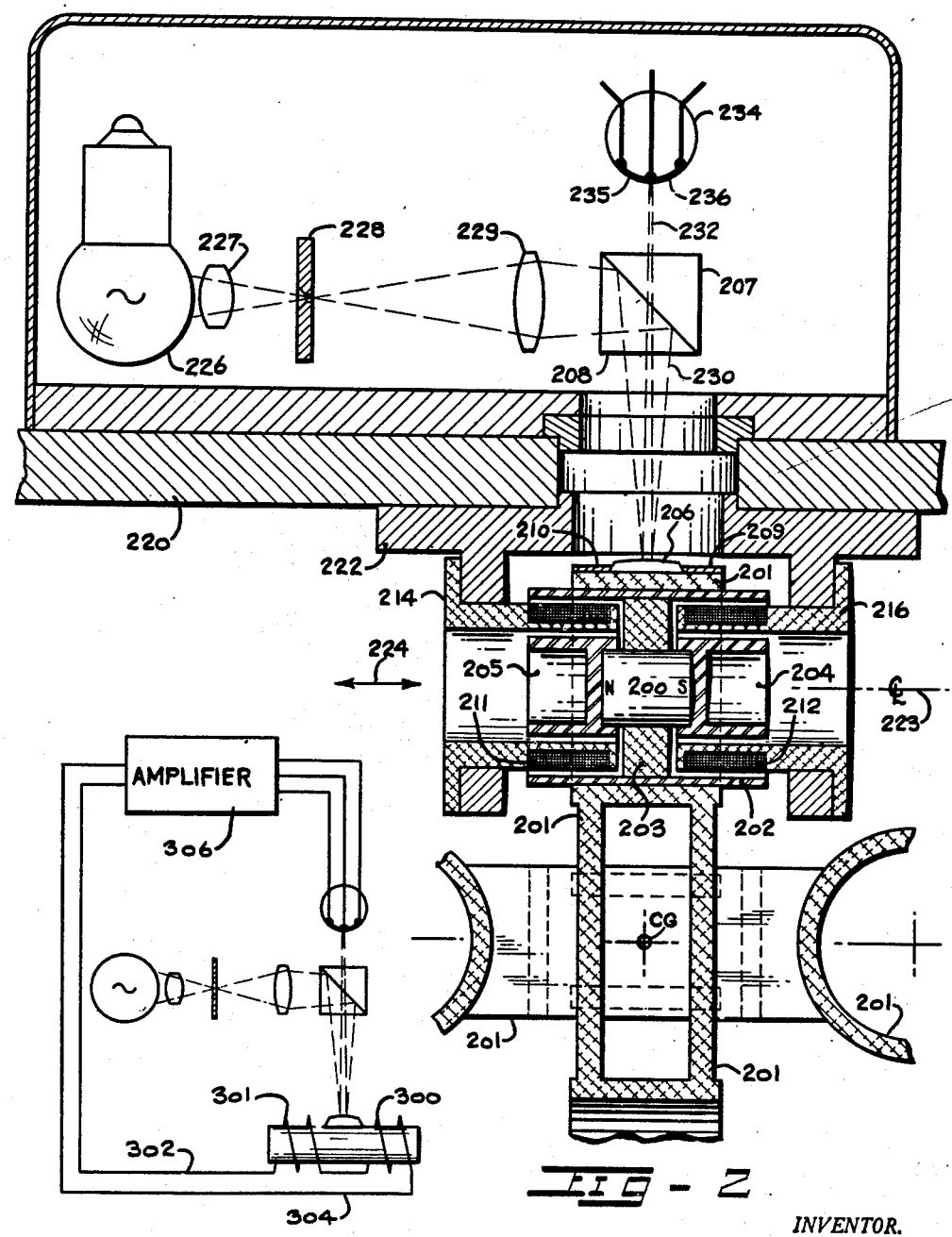
Fig. 2 is a sectional view of a single electromagnetic suspension element taken in a horizontal plane passing through the centerline 9, Fig. 1, and bisecting the mirror, the magnetic structure and the two coils, and viewed in the direction indicated by arrows 2—2 in Fig. 1; the view also includes an optical system and a light-sensitive three-electrode cell.
Fig. 3 is the schematic diagram of a single suspension element including the optical system, the electrical circuits and the electro-magnetic structure of the element.

Fig. 2 discloses a cross-sectional view of the outer end of a single arm of the triaxial cross, Fig. 1, this view disclosing the magnetic circuit of a permanent magnet, two current coils, and the optical system-light-sensitive cell combination used for optically magnifying small axial displacements of the permanent magnets and converting these displacements into two alternating currents whose amplitudes are a function of these magnet displacements with respect to any vehicle which supports the accelerometer. Since these currents are used for measuring the acceleration of the vehicle, it follows that the magnitude of these currents is also a function of the acceleration experienced by the vehicle at any given instant. Because all magnetic field structures are identical, it is necessary to describe only one of them. The permanent magnet 200, made of Alnico, is mounted in the center of its magnetic circuit including pole pieces 204, 205, and an outer sleeve 202, all of which are made of high permeability material. The magnet is connected to an arm 201 corresponding to any one of the previously mentioned arms 10 through 15. Arm 201 is rigidly connected to the outer sleeve 202. In the middle of sleeve 202, there is a non-magnetic ring 203, the central bore or opening within the ring being used for mounting the permanent magnet 200. The magnet forms rigid connection with ring 203, the two being joined by shrinking ring 203 over the permanent magnet. Sleeve 202 is shrunk over ring 203, while the pole pieces 204 and 205 are shrunk over respective ends of magnet 200. Accordingly, the magnetic circuit of permanent magnet 200 is as follows: North pole of permanent magnet 200, pole piece 205, air gap between pole piece 205 and sleeve 202, air gap between sleeve 202 and pole piece 204, pole piece 204, and finally the south pole of permanent magnet 200, which completes the magnetic circuit of the magnet. Arm 201 is connected to sleeve 202 in rigid manner so that the two form a unitary structure for all practical purposes. A plano-convex mirror 206 is mounted on top of arm 201, whose outer convex surface faces prisms 207 and 208. The mirror is rigidly attached to arm 201 by means of shims 209 and 210. Two coils 211 and 212, each having the shape of a hollow cylinder, are mounted on two non-magnetic members 214 and 216, which are attached to an accelerometer frame 220 through a frame member 222. From the above description of the magnetic structure of the accelerometer, it follows that the coils 211 and 212 are rigidly attached and supported by the main frame 220 of the accelerometer, which is attached to any moving objects, the acceleration of which is to be measured, such as an airplane. The coils are mounted directly within the air gaps formed by and between the members 205—202 and 204—202, these air gaps being also of ring-shaped configuration. Direct current is normally impressed on coils 211 and 212, the direction of the current in the two coils being in the opposite direction with the result that the magnetic fields produced by the coils will be in the opposite directions, but the forces exerted by these fields on the magnetic structure of the accelerometer such as pole pieces 204 and 205, are in the same direction and along the center line 223, either in one direction or the other, as illustrated by an arrow 224. Therefore, the resultant force acting on arm 201, because of the interaction between the magnetic fields, will be the sum of the two forces. This is so because the directions of the magentic fields produced by the permanent magnets within the two air-gaps are in the opposite directions. Since the direction of the current in the two coils is such as to produce two magnetic fields in the opposite directions, no demagnetizing effect will be produced by these fields on permanent magnet 200. Therefore, the magnetic field produced by the permanent magnet will remain constant. This assures the accuracy and stability of calibration of the accelerometer.

Referring once more to Fig. 1, examination of this figure illustrates the fact that there are six magnetic structures of the type illustrated in Fig. 2, these structures being structures 16 through 21. If the arms 12 and 13 are in a vertical plane, the entire weight of the test mass is supported by the upward thrust exerted by the interaction between the magnetic fields produced by the four coils 22, 23, 24, and 25 and the permanent fields produced by the two permanent magnets 16 and 19. The remaining coils do not exert any force on the triaxial cross so long as the cross is either stationary or is moving at a constant velocity. However, when the test mass is imparted any acceleration, because of the inertia of the mass, there will be a tendency for it to shift in the direction opposite to the direction of the acceleration, with the result that there will be a slight displacement of mirror 206 with respect to a beam of light 230 produced by a constant source of light 226. This beam of light is produced with the aid of a condenser lens 227, an aperture 228, a collector lens 229, and prisms 207 and 208. The convex surface of mirror 206 normally is so adjusted that when the entire system is in balance, the reflected beam 232 falls substantially on the central portion of a lead sulphide three-electrode cell 234. When this is the case, the conductivity of the left portion 235 of the cell is equal to the conductivity of the right portion 236 of the same cell, with the result that the two currents balance each other out in an amplifier and phase comparator 306, Fig. 3, or only sufficient current flows through windings 300 and 301 so as to maintain the test mass in a balanced condition. However, when there is a momentary slight shift of the mass structure with respect to the stationary main frame 220 of the accelerometer, the reflected portion 232 of the light beam 230 will be shifted from its normally central position either to the left or to the right, with the result that the reflected portion of the beam of light will be shifted toward portion 235 or 236 of the lead sulphide cell, depending upon the direction of the acceleration. This, at once, changes the conductivity of that portion of the cell which receives more light, with the result that the magnitude and the direction of the current appearing on conductors 302 and 304 connected to the output of amplifier 306 will be altered to the extent necessary to exert a force tending to restore the central position of the magnetic structure. The magnitude and the direction of the current necessary to oppose any change in the momentum of the test mass are used for measuring the acceleration by properly calibrating any current measuring device connected in series with conductors 302 and 304.

Figure 4:
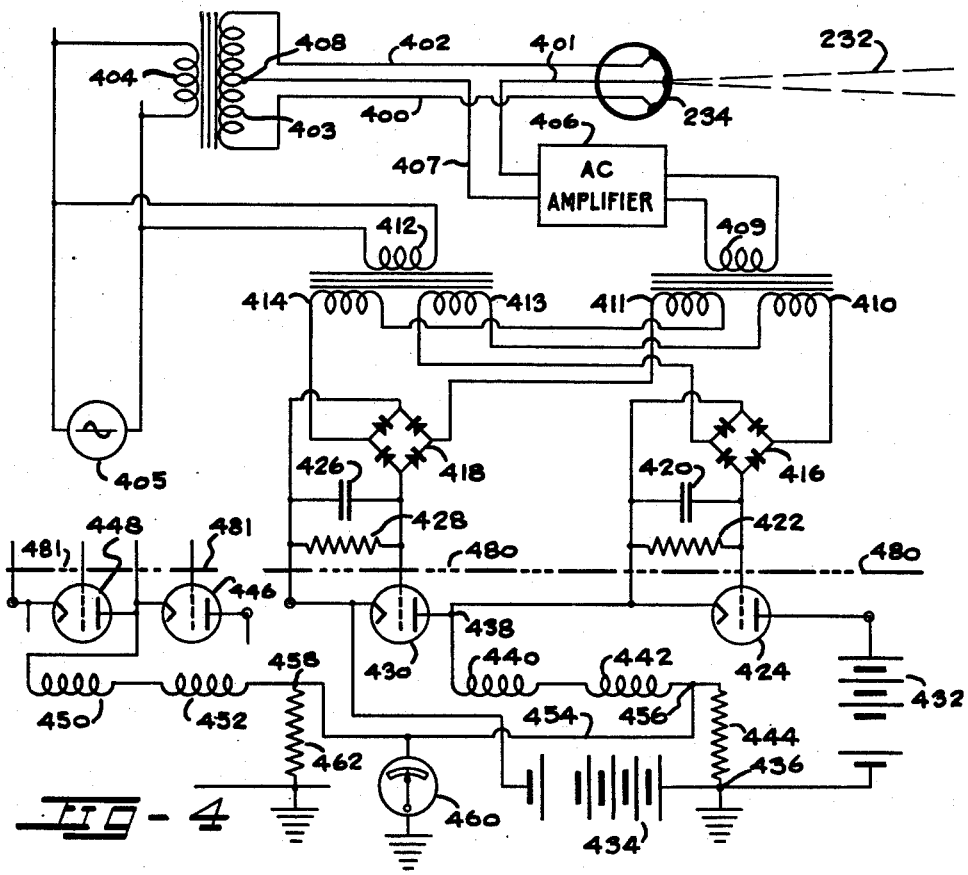
Figs. 4 and 5 are the schematic diagrams of amplifying and metering circuits used in the accelerometer for converting the current changes into meter readings calibrated in terms of acceleration units.

Fig. 4 is a schematic diagram of the circuits which are capable of performing the above mentioned function.

The light sensitive cell 234 and its two outgoing conductors 400 and 402 are connected across a secondary 403 of a transformer, the primary 404 of which is connected to a source 405 of alternating potential. An amplifier 406 is connected between conductors 401 and 407 which terminate at the center tap 408 of secondary winding 403. The output of amplifier 406 is connected to primary 409 of a transformer, which has two secondary windings 410 and 411. An identical transformer with a primary 412 and two secondaries 413 and 414, is used for impressing a constant alternating current potential on the secondaries 413 and 414. The secondaries 410 and 413 are connected across a full wave rectifier 416. The output of the rectifier is connected across a filtering, or integrating circuit, including a condenser 420 and a resistor 422, this filter being connected across the cathode-grid circuit of a triode 424. The same filtering arrangement, including condenser 426 and resistor 428, is connected across the output circuit of rectifier 418. This rectifier is connected across the secondaries 414 and 411. The cathode-grid circuit of triode 430 is connected across the filter circuit 426—428. Triodes 424 and 430 are connected in series, with the plate of triode 430 being connected to the cathode of triode 424, and the plate of triode 424 being connected to the positive terminal of a source of potential 432. A source of potential 434 is connected across the cathode-anode circuit of triode 430, and the junction point 436 is grounded. Junction point 436 is connected to a junction point 438 through the field windings of one pair of electromagnets 440 and 442 and a resistor 444.

The functioning of the circuit is as follows: When the beam of light 232, shining on the light sensitive surface of cell 234, is in its central position, as indicated in Fig. 4, the two sides of the cell have equal degrees of conductivity with the result that the voltages impressed by the left and right sides of the secondary 403 on the input circuit of amplifier 406 over conductors 401 and 407 are equal in magnitude and oppose each other in amplifier 406, with the result that they cancel each other, and no signal is impressed on the primary 409 and the secondaries 410 and 411. However, both of these secondaries are connected in series with the respective secondaries 414 and 413 which impress constant amplitude alternating current on the respective rectifiers 416 and 418. These alternating currents, upon their rectification and filtering by the respective filters appear across the cathode-grid circutis of the triodes 424 and 430, and since they are equal in amplitude, it follows that no output signal will appear in the field windings 440 and 442. Therefore, as long as the light beam 232 is in the central position on cell 234, the two output channels remain balanced, when the light beam 232 shifts either to the left or to the right from the center position indicated in Fig. 4, either the right or left side of cell 234 will become more conductive while the other side of the cell will become less conductive. Therefore, the amplitudes of the signals impressed by the left and right portions of the centrally tapped secondary 403 no longer will be equal, the amplitude of the side connected across that portion of the cell which has the highest resistance producing a higher amplitude of voltage and current than the other side. The difference between the two components will be amplified by amplifier 406 and will appear across primary 409 and the secondaries 410 and 411. The polarities of windings 410 and 413 are such that the component produced by the primary 409, and appearing in secondary 410, will aid and reinforce the current appearing across secondary 413. The result is that the output appearing across full wave rectifier 416 will render the grid of triode 424 more positive and the space current flowing across the cathode-plate circuit will be increased. The opposite effect will be produced on the grid of triode 430 because of the reversal of the polarity of the secondary 411. This being the case, the current appearing across the coils 440 and 442 will be substantially equal to the current flowing across the cathode-anode circuit of triode 424 and this current will resist the change in the position of the test mass.

In order to avoid the use of unnecessarily large number of meters, the coils whose action is in the same direction are combined in the manner indicated in Fig. 4, where triodes 446 and 448 and coils 450 and 452 correspond to the coils 24 and 25 of Fig. 1, if the coils 440 and 442 correspond to the coils 22 and 23 in Fig. 1. As stated previously, coils 22, 23, 24, and 25 constitute four coils which act in unison and always exert an identical force in terms of magnitude and direction on the test mass. Therefore, in order to obtain current indications for the coils 22, 23, 24, and 25, it will be sufficient if a conductor 454 is used for interconnecting the junction point 456 with the junction point 458; meter 460 is then connected between conductor 454 and ground. This meter indicates the current in both circuits since it is connected in parallel across resistors 444 and 462. It is to be understood, of course that the circuits for the coils 24 and 25, in the illustrated example, are identical to those used for the coils 22 and 23. This being the case, Fig. 4 illustrates only a portion of this circuit since the remaining part will be identical to that illustrated in the upper part of Fig. 4. While coils 22 through 25 are used in the above example, in actual practice, when the accelerometer is mounted on a platform which is maintained continuously in a horizontal plane irrespective of the position of the airplane with respect to the horizontal plane, no meter is used in connection with these coils. This is so because coils 22 through 25 furnish only an upward thrust for supporting the test mass and this reading, as a rule, does not enter into the determinations of accelerations, at least when only horizontal accelerations are contemplated. Therefore, under such conditions, only two meters are required, one meter being connected to the coils 28, 29, 32, and 33, while the other meter is connected to the coils 26, 27, 30, and 31. The circuits for these meters are identical to those illustrated in Fig. 4, and therefore need no additional description. For quick reading; the two meters are mounted side by side, or may be incorporated in a single housing with two meter needles and two scales, one for each needle.

Figure 5:
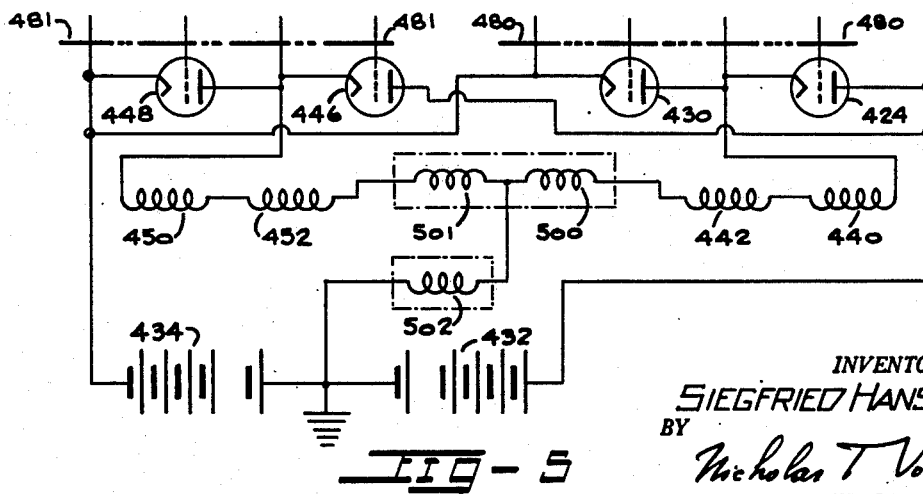

Fig. 5 discloses an alternate method of measuring currents produced in the output channels connected to two magnets. The input portion of these channels is identical to that illustrated in Fig. 4, and therefore Fig. 5 may be matched with Fig. 4 along lines 480 and 481 in order to obtain complete current amplifying and comparing channels. Since triodes 424, 430, 446, and 448 in Fig. 5 function in the same manner as the similarly numbered triodes in Fig. 4, they bear the same numerals in both figures. The same is true of the coils 440, 442, 450, and 452. The difference between the two figures resides in the meter connections. In Fig. 5, coils 500 and 501 are two mutually opposing coils of a differential meter while coil 502 is the coil of an integrating meter. In the meter itself, the opposing coils 500 and 501 are arranged in a conventional manner used in differential meters for obtaining the difference between the current flowing in coil 501 and the current flowing in coil 500. In view of this differential arrangement in the coils, currents flowing in these coils will subtract from each other when the forces acting on the permanent magnets, such as magnets 16 and 19, Fig. 1, act in the same direction. However, when the test mass is subjected to rotation around the axis of the arms 10 and 11, then the currents flowing in the differential windings 500 and 501 will aid and reinforce each other because the permanent magnets 16 and 19 are now moving in the opposite directions. Comparison of this meter circuit with the meter circuit disclosed in Fig. 4 discloses that while in Fig. 4 the two currents flowing through meter 460, under the same conditions or rotation, would subtract from each other, they aid each other in Fig. 5. The integrating meter 502 is used for integrating relatively fast changes in acceleration which may take place, and for presenting the reading of the differential meter in an integrated manner on a scale of the integrating meter.

High sensitivity is obtainable with the accelerometer of the illustrated type because it is suspended in air by the interaction between the magnetic fields which may be compared to the interaction present in any dynamic loud-speaker between a voice coil and permanent field produced by a permanent magnet. The accelerometer does not use any springs or any other type of mechanical supports for the triaxial cross, nor are there any connecting wires between the test mass and the main frame of the accelerometer. Therefore, any change in the momentum of the test mass is converted at once into currents which are capable of very precise and quick measurements.

What is claimed is:

1. An accelerometer comprising a test mass and means for electro-magnetically mounting said test mass, said means including a plurality of elements for producing a corresponding plurality of permanent magnetic fields with the aid of said test mass, a corresponding plurality of sources of direct current for generating a corresponding plurality of direct currents, and a corresponding plurality of fixed coils respectively coupled to said sources, said coils being in spaced relationship with respect to said elements, whereby said coils convert said currents into a corresponding plurality of electro-magnetic fields, in interacting relationship with the respective permanent magnetic fields, for supporting the weight of said test mass solely by said interacting relationship between said permanent magnetic fields and the respective electro-magnetic fields; a corresponding plurality of electro-optical instrumentalities electrically coupled to said sources and optically connected to said elements for automatically adjusting the magnitudes of said currents and of said electro-magnetic fields for generating a counter thrust equal to the thrust exerted by said test mass on said electro-magnetic fields through said permanent magnetic fields because of any change in the momentum of said test mass in response to any acceleration imparted to said test mass; and means for measuring the magnitudes of said currents for obtaining the instantaneous value of said acceleration.

2. An accelerometer comprising a centrally magnetically mounted test mass, a plurality of permanent magnets at the extreme outer ends of said test mass, said magnets producing a corresponding plurality of permanent magnetic fields, a corresponding plurality of field coils in spaced relationship with respect to said permanent magnets, each of said coils having first and second coil elements respectively in spaced relationship with respect to the north and south poles of the respective magnet, a corresponding plurality of sources of direct currents, said sources being connected to said coils whereby said currents produce a corresponding plurality of electro-magnetic fields in interacting relationship with the respective permanent magnetic fields for supporting the weight of said test mass solely by means of said interacting relationship, and a corresponding plurality of electro-optical instrumentalities electrically coupled to said sources and optically coupled to said test mass for adjusting the magnitudes of said currents and of said electro-magnetic fields for generating a counter-thrust equal to the thrust exerted by said test mass on said electro-magnetic fields through said permanent magnetic fields in response to any change in the momentum of said test mass because of any acceleration imparted to said test mass.

3. An accelerometer, as defined in claim 2, in which said test mass comprises a triaxial cross having six arms of equal length and mass, one of said permanent magnets rigidly attached to the outer end of each of said arms.

4. An accelerometer, as defined in claim 3, in which said first and second coil elements are connected in series opposition whereby said first coil element produces an electro-magnetic field in one direction, and said second coil element produces an electro-magnetic field in the opposite direction, said one direction and said opposite direction being substantially parallel to the axis of said magnet, whereby the electro-magnetic fields produced by said first and second coil elements are incapable of exerting any demagnetizing effect on said magnet.

5. An accelerometer, as defined in claim 4, in which said electro-optical instrumentality includes an optical system producing a beam of light, a reflecting mirror mounted on the outer surface of said corresponding permanent magnet intercepting and reflecting said beam of light, and a light sensitive cell in the path of the reflected beam of light for varying the magnitude of said corresponding current in response to any change in the position of said test mass with respect to said beam of light.

6. An accelerometer including a test mass, said test mass comprising a centrally located triaxial cross having six arms, and a permanent magnet at the outer end of each arm, said magnet producing a constant magnetic field; two fixed coils in spaced relationships with respect to each magnet, one of said coils being in spaced relationship with respect to the north end, and the other coil being in spaced relationship with respect to the south end of each magnet; a source of direct current connected across said coils for producing current in said coils, said current-producing electro-magnetic fields around said coils, said coils being connected in series opposition, and an electro-optical instrumentality electrically coupled to said source and optically coupled to said magnet for adjusting said current to a value whereby said electro-magnetic fields exert an automatically adjustable thrust on said magnet equal and opposite to the thrust exerted by said constant magnetic field on said electro-magnetic fields due to the force of gravity on said test mass and due to any acceleration of said test mass.

7. An accelerometer comprising a magnetically mounted test mass having a plurality of permanent magnets producing a corresponding plurality of permanent magnetic fields, a mirror having at least one curved surface mounted on each magnet, an optical system for each magnet, said system including a beam of light directed on said mirror, a three-electrode light-sensitive cell in the path of the light beam reflected by said mirror, a source of alternating current connected to said cell, a phase-sensitive amplifier connected to said cell, said amplifier having an output circuit producing a flow of direct current in one direction when the reflected beam of light is to the left and in the opposite direction when said beam is to the right of its central position on said cell, and two stationary current coils connected in series with said output circuit, said current coils being in spaced relationship with respect to the north and south poles of said permanent magnet, respectively, said coils producing electro-magnetic fields for supporting said test mass in spaced relationship with respect to said coils and for counteracting a thrust produced by said test mass on said coils through an interaction between said permanent magnetic fields and said electro-magnetic fields in response to any change in the momentum of said test mass due to acceleration imparted to said test mass.

8. An accelerometer, as defined in claim 7, in which said test mass comprises a triaxial cross having six arms of equal length and mass with six permanent magnets mounted at the respective ends of said arms, and a meter connected in shunt to two output circuits of two of said phase-sensitive amplifiers connected to the coils positioned in spaced relationship with respect to any two of said permanent magnets located at the ends of two of said arms having a common axis.

References Cited in the file of this patent

UNITED STATES PATENTS

| Number | Name | Date |
| --- | --- | --- |
| 2,136,219 | Scherbatskoy | Nov. 8, 1938 |
| 2,256,937 | Beams et al. | Sept. 23, 1941 |
| 2,305,416 | Hansen | Dec. 15, 1942 |
| 2,338,732 | Nosker | Jan. 11, 1944 |
| 2,498,997 | McLean et al. | Feb. 28, 1950 |
| 2,507,301 | Fulbright | May 9, 1950 |

FOREIGN PATENTS

| Number | Country | Date |
| --- | --- | --- |
| 571,613 | Great Britain | Aug. 31, 1945 |